United States Patent [19]
Honda

[11] Patent Number: 5,327,077
[45] Date of Patent: Jul. 5, 1994

[54] DEVICE INCLUDING AN EVEN NUMBER OF EQUALLY SPACED MAGNETO-RESISTORS FOR DETECTING ROTATION OR STRAIGHT MOTION OF A MOVING BODY

[75] Inventor: Shuichi Honda, Kyoto, Japan

[73] Assignee: Murata Mfg. Co. Ltd., Japan

[21] Appl. No.: 997,208

[22] Filed: Dec. 28, 1992

[30] Foreign Application Priority Data

Jan. 6, 1992 [JP] Japan .................................. 4-018289

[51] Int. Cl.$^5$ ........................ G01P 3/488; G01P 3/50; G01B 7/14; G01D 5/14
[52] U.S. Cl. ................................ 324/207.21; 324/173; 324/207.25
[58] Field of Search .................. 324/207.21, 207.24, 324/207.25, 252, 166, 173, 174

[56] References Cited

U.S. PATENT DOCUMENTS

| | | |
|---|---|---|
| 4,612,502 | 9/1986 | Spies . |
| 4,806,860 | 2/1989 | Iijima et al. .................... 324/207.21 |
| 5,047,716 | 9/1991 | Katagiri .......................... 324/207.21 |

FOREIGN PATENT DOCUMENTS

| | | |
|---|---|---|
| 0112463 | 7/1984 | European Pat. Off. . |
| 0235750 | 9/1987 | European Pat. Off. . |
| 0242482 | 10/1987 | European Pat. Off. . |
| 0234109 | 9/1988 | Japan .............................. 324/207.21 |

Primary Examiner—Gerard R. Strecker
Attorney, Agent, or Firm—Laff, Whitesel, Conte & Saret

[57] ABSTRACT

A movement detector device consumes less power and provides a high detection reliability. The teeth on a rotating gear are magnetically detected. There are a number of interconnected magneto-resistors MR1 through MRi connected in series, with the series circuit connected between a power supply line and a ground line. There are output signal pickup points P1 through P7 at the connections between the adjacent magneto-resistors. Signals outputted from these signal pickup points P1 through P7 are shifted in their phases by ¼period with respect to each other. These signals are paired, and each of the paired signals is fed to a differential amplifier circuit to provide signals E1 through E4 as detection signals. In another embodiments, a linear member has a number of magnetic spots which may be detected in the same manner that the gear teeth are detected.

3 Claims, 5 Drawing Sheets

DEVICE INCLUDING AN EVEN NUMBER OF EQUALLY SPACED MAGNETO-RESISTORS FOR DETECTING ROTATION OR STRAIGHT MOTION OF A MOVING BODY

BACKGROUND OF THE INVENTION

1. Field of the Invention

The present invention relates to a detector device using magneto-resistors for detecting the movement of a moving body and more particularly for detecting a rotation of a rotating body and a straight movement of a moving body.

2. Description of the Prior Art

There are conventional known varieties of movement detector devices for monitoring moving bodies,each device serving to detect rotational movement of rotators and straight advance movements of moving bodies.

FIG. 1 illustrates an exemplary detection of the rotation of a motor shaft 2 with use of a movement detector device (rotation sensor)1. In the same figure, the motor shaft 2 includes a gear 3 to be detected fitted thereover. To a peripheral surface of gear 3, a detection surface of the movement detector device 1 is opposed via a gap. The gear 3 is made of a ferromagnetic material As seen from FIG. 2, the movement detector device 1 includes a casing 4 and a magnet 5 that generates a bias magnetic field. On the upper end surface of magnet 5 are disposed four magneto-resistors $MR_{A1}$, $MR_{A2}$, $MR_{B1}$ and $MR_{B2}$ as illustrated in a circuit diagram of FIG. 3, the magneto-resistors $MR_{A1}$ and $MR_{A2}$ being connected in series with each other to construct a first phase detector circuit. The magneto-resistors $MR_{B1}$ and $MR_{B2}$ are also connected in series with each other to construct a second phase detector circuit.

The first phase detector circuit and the second phase detector circuit are interconnected in parallel with each other. One end of the parallel circuit is connected to a power source line 6 and the other end is connected to a ground line 7.

A first phase detection signal is taken out from a connection portion between the magneto-resistors $MR_{A1}$ and $MR_{A2}$ while a second phase detection signal is taken out from a connection portion between the magneto-resistors elements $MR_{B1}$ and $MR_{B2}$.

These magneto-resistors $MR_{A1}$, $MR_{A2}$, $MR_{B1}$, and $MR_{B2}$ are disposed, with respect to the gear 3 to be detected, as illustrated in FIG. 4. More specifically, when the magneto-resistors $MR_{A1}$ and $MR_{B1}$ are opposed to the crest $3a$ of one tooth of the gear 3, the magneto-resistors $MR_{A2}$ and $MR_{B2}$ are opposed to the root $3b$ between two teeth of the gear 3. Therefore, with a pitch of the teeth of the gear 3 assumed to be T, $MR_{B1}$ is shifted in phase by T/4, $MR_{A2}$ by T/2, and $Mr_{B2}$ by 3T/4 with respect to the magneto-resistor $Mr_{A1}$.

Herein, designated at 8 (FIGS. 2 and 3) are terminals for the power supply line 6, for the ground line 7, and for taking out the detection signals from the, magneto-resistors. Terminals 8 are connected to detector circuits of the respective magneto-resistors via a lead frame 10.

The movement detector device 1 is opposed to the gear 3. With the motor shaft 2 rotated a first phase detector circuit signal and a second phase detector circuit signal are picked up during time periods separated by T/4, with respect to each other as illustrated in FIG. 5. Analyses of the signal voltages clarify the amount of the rotational movement, rotational speed, and revolutions of the motor shaft 2. Further, the pick-up of the signals of two different phases allows an estimation of the direction of rotation of the motor shaft 2.

In order to raise the resolution of such rotation detection using the above movement detector device 1, however, a use should be made of a gear of a small module where a pitch T of the teeth of the gear 3 is replaced by a smaller pitch. Further, since a gap G existing between the detection surface of the movement detector device 1 and the gear 3 is increased, the sensitivity of the device is decreased. Therefore, it is necessary to decrease the gap G.

However, provided that the module of the gear 3 is decreased to reduce a pitch interval of the gear, the number of magneto-resistors disposed within that pitch can not be increased. Additionally, as the pitch of the teeth is decreased, a detection output is reduced as illustrated in FIG. 6. Hence, if the detection output is to be increased correspondingly, and, if it is to be detected the gap G between the gear 3 and the detection surface of the movement detector device 1 must be further reduced.

With the gap G made very small, however, it is difficult to position the movement detector device 1, and since the gear 3 is almost certain to be at least a little eccentric, there is a problem of the teeth of the gear 3 possibly making contact with the detection surface of the movement detector device 1. To avoid the just-mentioned problem, there is a difficulty of accurately machining gears and the device assembly so that the gear 3 must be machined without causing any eccentricity and with an almost religious care.

Further, in the prior art movement detector device, the detector circuits of the magneto-resistors in the respective phases are connected in parallel to each other and between the power supply line 6 and the ground line 7, so that an application of voltage to each detector circuit of each magneto-resistor in each phase becomes greater. Accordingly, as the detector circuits of the magneto-resistors are constructed in multiple phases, the power consumption is severely increased and the heat produced by the increase of the power badly affects the detection performance.

SUMMARY OF THE INVENTION

To solve these problems with the prior art, it is an object of the present invention to provide a movement detector device for moving bodies which is capable of a high resolution movement detection by using a body to be detected such as a gear with a greater pitch and with reduced power consumption but without causing an excessive heat production.

To achieve the above object, a movement detector device for moving bodies according to the present invention is constructed as follows: An even number, four or more, of magneto-resistors, are fixedly mounted above the pole-faces of a magnet. The magneto-resistors are located in the direction of the movement of a part on a magnetic body which is to be detected in equal pitch intervals which locations are yielded by equally dividing the pitch of the part to be detected, and are separated from the body to be detected by a gap. Those plurality of the magneto-resistors are connected in series and nodes between the adjacent magneto-resistors form pick-up portions for output signals.

Further, in the movement of the detector device arranged as described above, there is a signal processor circuit wherein differential amplification of pairs of signals is obtained from respective pick-up portions each paired signal having a phase difference of a ½ period.

In accordance with the present invention constructed as above, a gap separates the movement detector device from a movable body. Once the movable body is moved, magnetic lines of force generated from a biassed magnet are altered depending upon a location of a detected tooth portion while the detected portion provided on the movable body is opposed to the magneto-resistor. Accordingly, signals corresponding to the locations of the detected portion are picked up from output signal pick-up points at the series nodes between the adjacent magnetic elements owing to changes in magnetic flux densities applied to the respective magneto-resistors. Signals having a ½ period phase difference are rendered to differential amplification with the signal processor circuit as an output movement detection signal of the detected body.

BRIEF DESCRIPTION OF THE DRAWINGS

The above and other objects, features and advantages of the present invention will be better understood from reading the following description of the preferred embodiments taken in connection with the accompanying drawings in which.

DETAILED DESCRIPTION OF PREFERRED EMBODIMENTS

In the following, preferred embodiments of a movement detector device for moving bodies will be described with reference to the accompanying drawings. Like symbols shall be applied to like portions of those of the foregoing prior art example, and the description thereof will be neglected.

Figure 1:
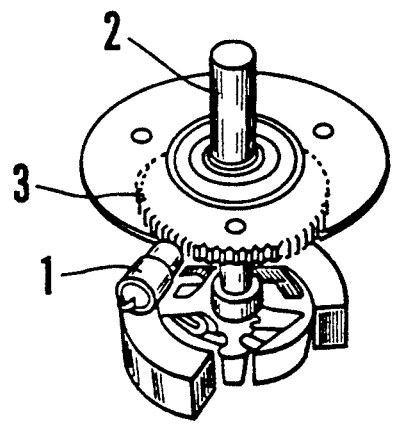
FIG. 1 is a perspective view illustrating the detection of a rotational movement of a motor shaft with a gear being taken as a body to be detected.
Figure 2:
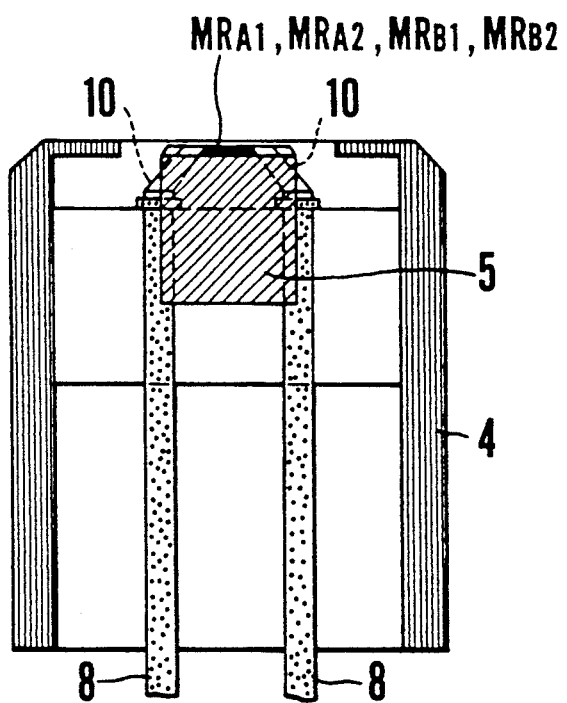
FIG. 2 is a cross sectional view illustrating a general arrangement of a movement detector device for moving bodies.
Figure 3:
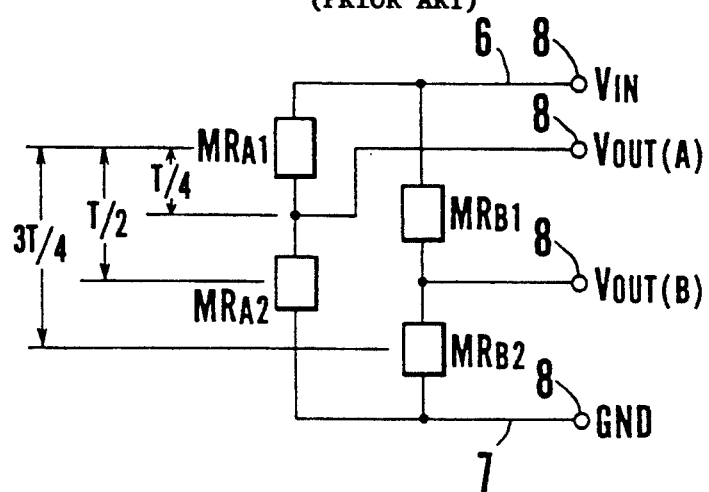
FIG. 3 is a circuit diagram of a prior art movement detector device for moving bodies using magneto-resistors.
Figure 7:
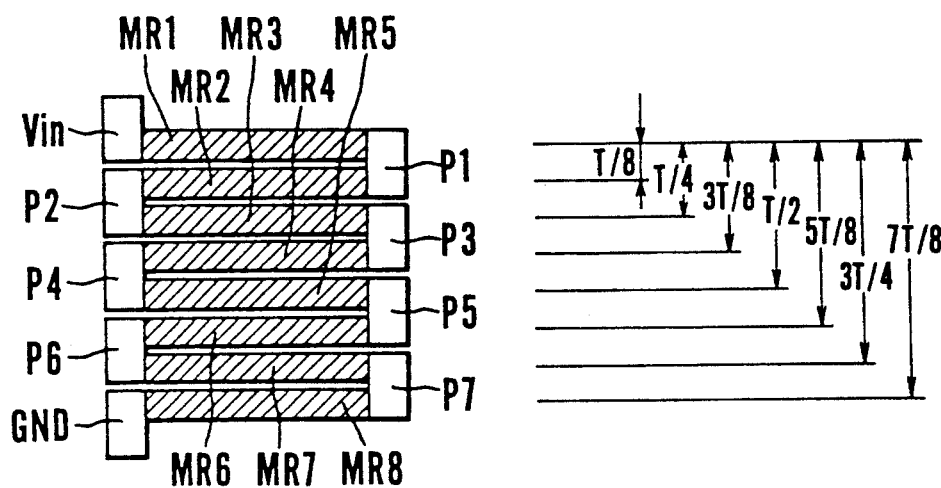
FIG. 7 illustrates the arrangement of a portion of a preferred embodiment of a movement detector device for moving bodies.
Figure 8:
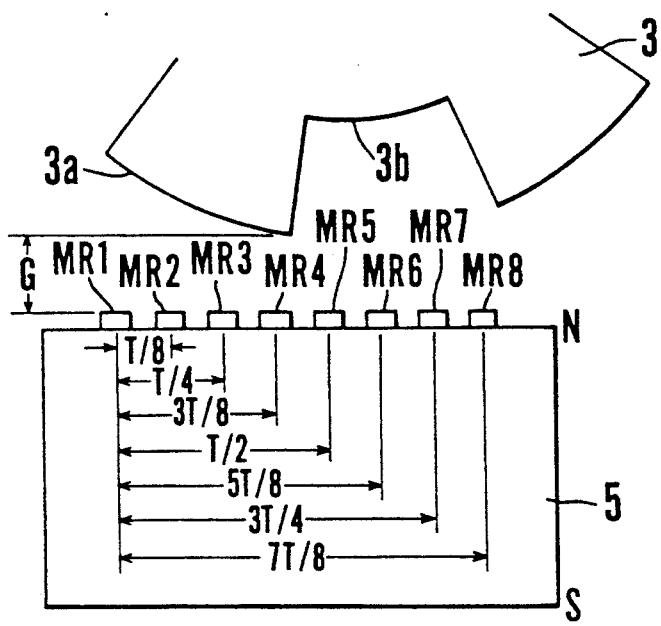
FIG. 8 is a view illustrating an interrealtion between the arrangement of magneto-resistors and a gear.
Figure 9:
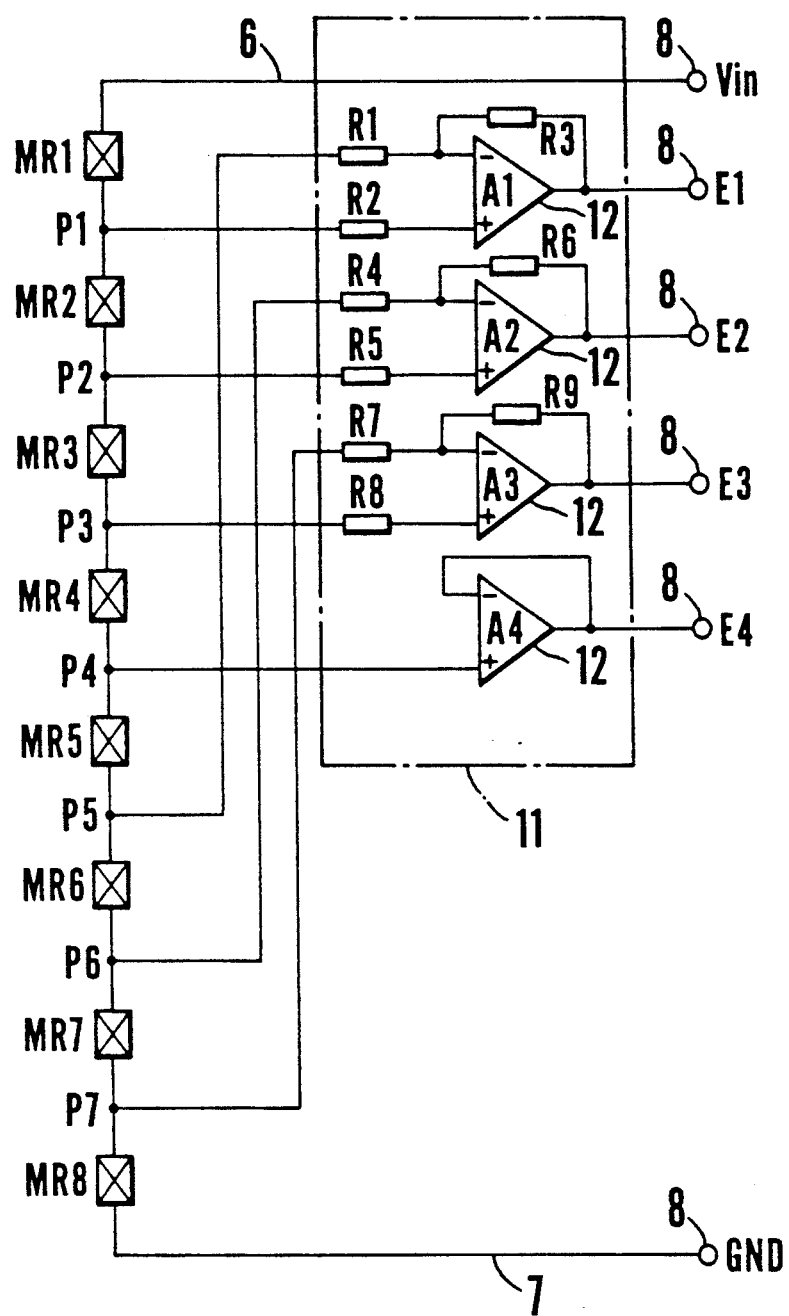
FIG. 9 is a circuit diagram illustrating the arrangement of a circuit of the preferred embodiment.

FIGS. 7 and 8, show an arrangement of a portion of an inventive embodiment of a movement detector device and a circuit diagram of the same device. The movement detector circuit of the present embodiment is also constructed with a use of magneto-resistors in the same manner as in the prior art example. Each magneto-resistor is disposed on the upper end surface of a magnet 5 contained in a casing 4 as illustrated in FIG. 2. The present embodiment is characterized in that the magneto-resistors MR1 through MR8 disposed on the upper end surface of the magnet 5 are connected in series with each other, and that output signal pickup points P1 through P7 (FIG. 9) are provided at series connection portions.

For the eight magneto-resistors MR1 through MR8, when the four magneto-resistors MR1 through MR4 are opposed to a tooth crest 3a of a gear 3, a body to be detected, the remaining magneto-resistors MR5 through MR8 are opposed to a tooth root 3b of the gear 3. Thereupon, with a tooth pitch T of the gear 3 assumed to be T, the respective magneto-resistors MR1 through MR8 are arranged in the interval of T/8. The respective magnetic elements MR1 through MR8 output sinusoidal signals at the signal pickup portions P1 through P7 as a result of a rotation of the gear 3, as the body to be detected.

More specifically, with an application of voltage in from the power supply line 6, the output signal from the signal pickup portion point P1 (FIG. 9) becomes:

$$(7R - r\sin\theta)V_{in}/8R$$

the output signal from P2 becomes:

$$\{6R - (2+2\tfrac{1}{2})r\sin(\theta+\pi/8)\}V_{in}/8R$$

the output signal from P3 becomes:

$$\{5R - (1+2\tfrac{1}{2})r\sin(\theta-\pi/4)\}V_{in}/8R$$

the output signal from P4 becomes:

$$\{4R - (4+2\times 2\tfrac{1}{2})r\sin(\theta-3\pi/8)\}V_{in}/8R$$

the output signal from P5 becomes:

$$\{3r - (1+2\tfrac{1}{2})r\sin(\theta-\pi/2)\}V_{in}/8R$$

the output signal from P6 becomes:

$$\{2R - (2+2\tfrac{1}{2})r\sin(\theta-5\pi/8)\}V_{in}/8R$$

and the output signal from P7 becomes:

$$(R - r\sin(\theta - 3\pi/4))V_{in}/8R$$

Herein, R denotes a central value of a resistance change in each magneto-resistor, r denotes variations of the resistance change, and $\theta$ denotes the amount of rotational movement of the gear 3, with a relationship of $2\pi = T$.

It is understood from the foregoing equations that the output signals P1 and P5 are shifted in their phases by T/2 or 180°, and likewise P2 and P6, and P3 and P7 are paired respectively as signals shifted in their phases by T/2. Those paired signals are differentially amplified through differential amplifier circuits 12 of a signal processor circuit 11. The signals picked up at points P1 through P4 provide detection output signals E1 through E4 of the body to be detected after passage through buffer amplifiers. The detection signals E1 through E4 take their centers at $V_{in}/2$ as sinusoidal signals of the amplitude and period with the form of $(4+2\times 2\tfrac{1}{2}) r \cos\theta$.

These detection signals E1 through E4 are signals shifted in their phases by $\pi/8$, whereby when the gear 3 is rotated, the amount of the rotational movement, rotational speed, and number of revolutions of the gear 3 are estimated by the analysis of the detection signals E1 through E4.

Since in the present embodiment the magneto-resistors MR1 through MR8 are interconnected in series with each other between the power source line 6 and the ground line 7, the voltage applied to each of the respective magneto-resistors MR1 through MR8 is greatly reduced as compared with the prior art example. Accordingly, the current consumed in the present embodiment becomes $V_{in}/8R$, which is reduced to 1/16 as compared with $4V_{in}/2R$ in the prior art device, to enable the consumed power to be greatly reduced. Further, with the number of the phases is increased or the number of the magnetic elements are increased. The foregoing ratio is further reduced for further saving of reducing consumed power. The saving of the consumed power solves the heat production problems in the prior art because the respective elements MR1 through MR8 adversely affects performance of the device.

Further, since the power consumption is reduced, the reduced sizes of the magneto-resistors MR1 through MR8 are ensured. Hence, the arrangement density is raised through an increase of the number of the magneto-resistors, which enables any body to be finely detected with a high resolution.

Figure 4:
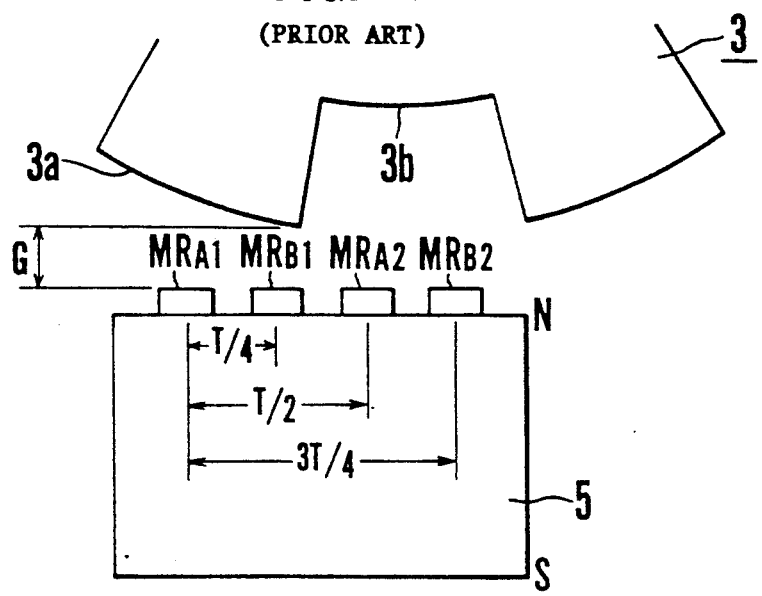
FIG. 4 is a view illustrating an interrelation between the arrangement of the magneto-resistors and teeth on a gear of the body to be detected in the prior art example.
Figure 5:
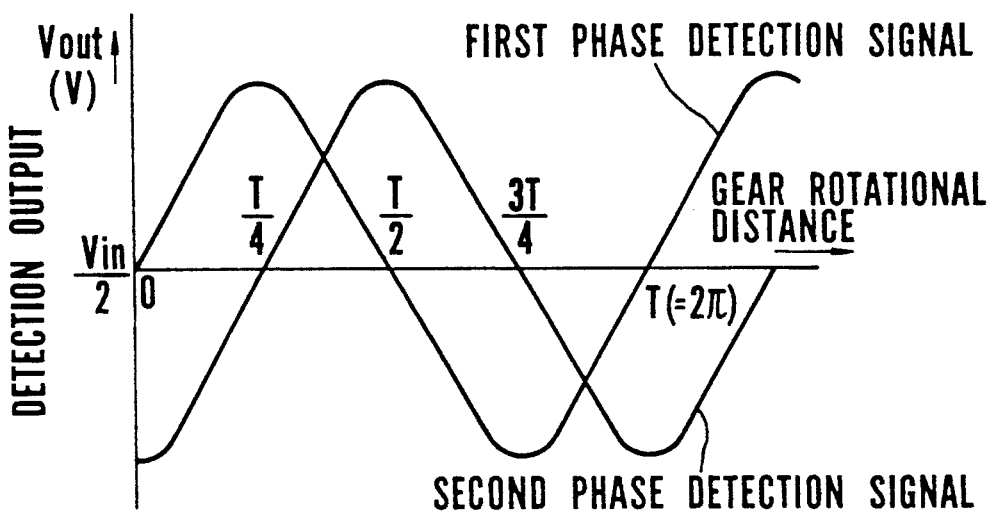
FIG. 5 is a graphical illustartion of exemplary detection of a rotational movement in the state of FIG. 1.
Figure 6:
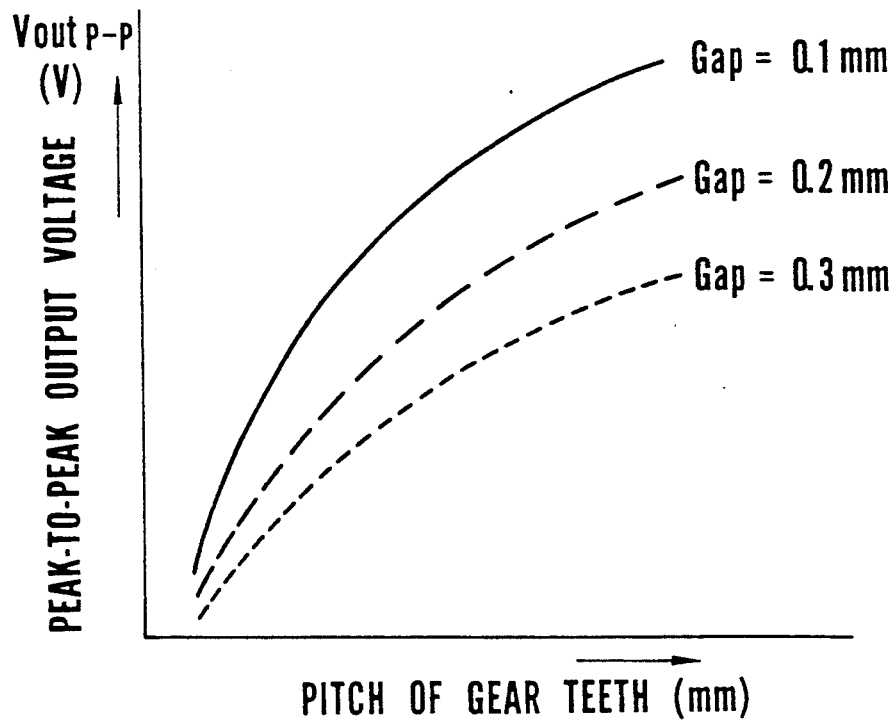
FIG. 6 is a graphical illustration of an interrelation between a teeth pitch of a gear as a body to be detected and a level of a signal to be detected.

Additionally, since the reduced current consumed through the magneto-resistors MR1 through MR8 is ensured, a pitch of a body to be detected, a pitch of the gear 3 in the present example, can correspondingly be increased, i.e., a use can be made of a larger module gear, which ensures as illustrated in FIG. 4 that the output detection signal can be increased. Hence, the gap G between the gear and the body to be detected can be correspondingly increased. Accordingly, less care is required in avoidance of any trouble of the gear 3, such as an eccentricity of the same. Hence, the mounting adjustment of the movement detector device 1 is facilitated and the structure of a mounting device can be simplified. In addition, with the increased size of the gear 3, the number of the magneto-resistors disposed within one pitch of the gear 3 can advantageously be further increased.

Further, the present invention can take a varieties of modifications without being limited to the above embodiment.

Although in the above embodiment the gear 3 was used as the body to be detected, other structures may be used for the body to be detected. For example, a magnetic substance may be provided at equi-pitched intervals as the part to be detected on a straight, linear nonmagnetic scale. For another example, a straight linear magnetic scale may be magnetized at equi-pitched intervals to be employed as a part to be detected. Using those straight, linear scales, a detection of the feeding of a bed of a machine tool, for example, is likewise achieved.

Further, although in the above embodiment the eight magneto-resistors were provided, the number thereof is not limited to eight provided those magneto-resistors are of four or more or of an even number.

Furthermore, the signal processor circuit 11, which includes a plurality of the differential amplifiers 12 for processing the output signals P1 through P7 from the respective signal pickup parts and resistors R1 through R9, may be disposed in the device casing 4 or may be disposed outside the casing 4.

In accordance with the present invention, magneto-resistors of four or more for detecting the part of the body to be detected are interconnected in series to take out output signals from the connection portions thereof, so that power spent operating the device can be reduced and hence heat production due to the magneto-resistors is avoided.

Further, in the case for example where the gear is used for movement detection of the rotation thereof, the pitch of the part to be detected, i.e., the pitch of the gear can be increased to increase an output detection signal and hence the gap between the part to be detected and the gear can correspondingly be increased whereby positioning between the body be detected and the movement detection device as well as mounting of the movement detector device are greatly facilitated.

Further, since the pitch of the part of the body to be detected such as the gear can be increased and the power consumption can be reduced, the number of the magneto-resistors can correspondingly be increased, whereby a fine movement of a body can be detected and hence the reliability of the movement detector of a movable body can be improved.

Additionally, the pickup number of detection signals can be increased by interconnecting the magneto-resistors in series to each other, which is very advantageous to signal processing.

What is claimed is:

1. A movement detector device for a moving body comprising;

a magnet having pole faces;

an even number of magneto-resistors each fixedly mounted in a plane above one of said pole-faces of said magnet and located in the direction of movement of a ferromagnetic part to be detected arranged on a moving body, said part having a plurality of detection portions spaced apart by an equal pitch;

said magneto-resistors being spaced to equally divide a distance corresponding to said pitch of the part to be detected, and further being separated from the body by a gap;

said magneto-resistors being interconnected in series with each other;

output signal pickup points provided at locations where connecting portions appear between the adjacent magneto-resistors; and a signal processor circuit for differentially amplifying a pair of signals among the signals taken out from the output signal pickup parts, those signal having a phase difference equal to ½ a period, and outputting the outputs rendered to the differential amplification as detection signals.

2. A movement detector device for a moving body according to claim 1 wherein said even number of the magneto-resistors is of four or more.

3. A movement detector device for a moving body according to claim 1 wherein said detection signals are sinusoidal signals shifted by T/8 of a sinusoidal period, with T being equal to the pitch of the part to be detected.

* * * * *